UNITED STATES PATENT OFFICE.

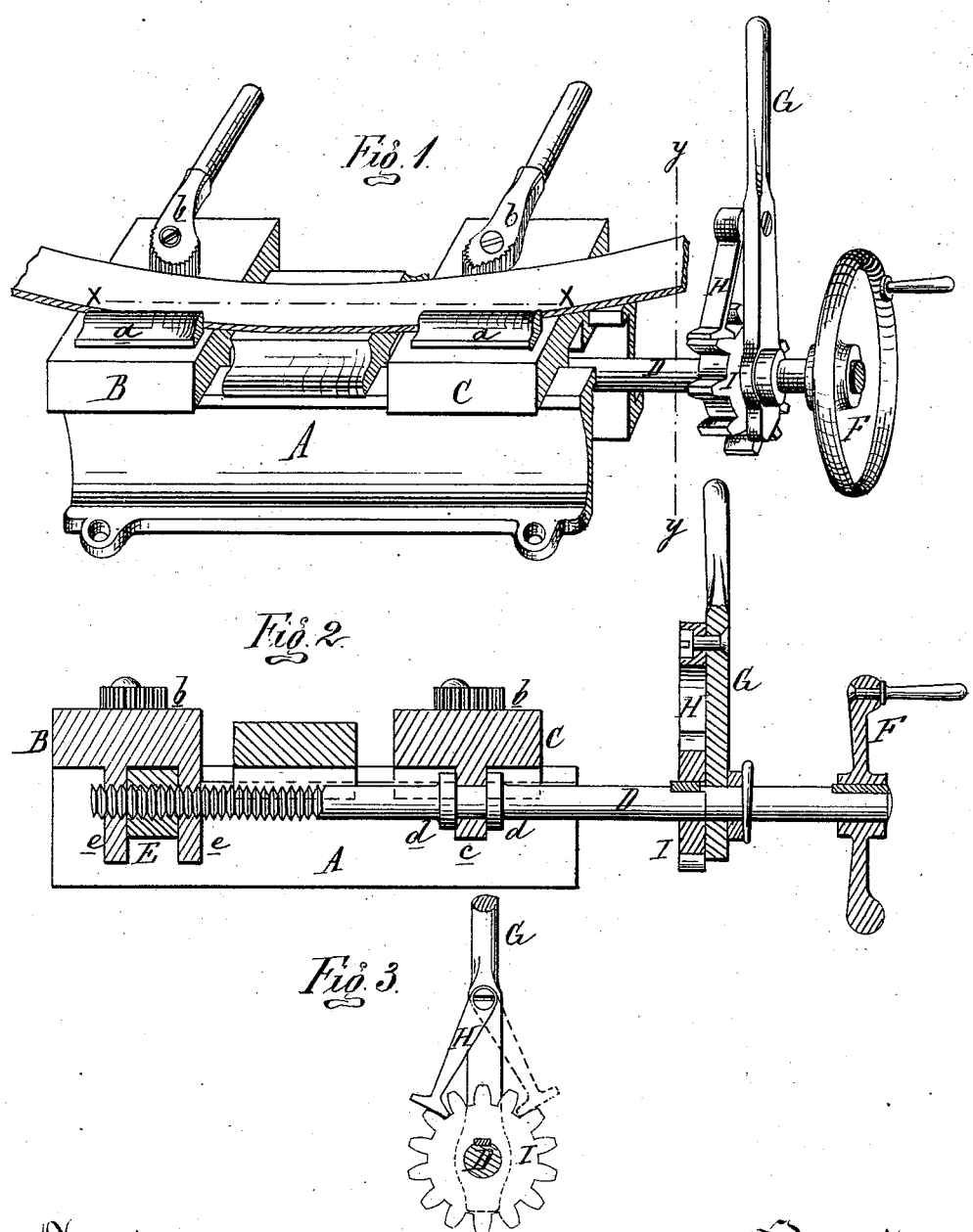

HARLOW S. VINTON, OF BERRIEN SPRINGS, MICHIGAN.

IMPROVEMENT IN TIRE-UPSETTING MACHINES.

Specification forming part of Letters Patent No. 161,844, dated April 6, 1875; application filed November 17, 1874.

*To all whom it may concern:*

Be it known that I, HARLOW S. VINTON, of Berrien Springs, in the county of Berrien and State of Michigan, have invented an Improvement in Tire-Shrinkers, of which the following is a specification:

The nature of this invention consists in the peculiar construction of a tire-shrinker of that class wherein a movable clamp is forced toward the stationary clamp by a screw tapped through a nut embedded in the stationary clamp, and engaged with the movable one by two collars. It more particularly consists in the combination, with the screw, of a double-acting pawl-lever and ratchet, by means of which great power can be exerted through the screw upon the tire.

Figure 1 is a perspective view. Fig. 2 is a longitudinal vertical section at $x\,x$ in Fig. 1. Fig. 3 is a cross-section of the screw at $y\,y$, showing the pawl lever in side elevation.

In the drawing, A represents a bed-plate, on one end of which is secured a stationary clamp-block, B, having a rib, $a$, longitudinally raised on its upper surface, against which rib the tire is clamped by a serrated cam, $b$, pivoted to said block at the other side of the tire. C is a movable clamp-block sliding in ways on the bed-plate, but is otherwise like the block B, having the rib and cam for clamping the tire. D is a screw journaled through a pendent lug, $c$, under the block C, with a collar, $d$, at each side of said lug. Its threaded end is tapped through a nut, E, placed between two lugs, $e\,e$, pendent from the stationary block. On the outer end of the screw there is a hand-wheel, F, by which it may be rapidly rotated when but little power is required; but to exert great upsetting power, a pawl-lever, G, is sleeved on the shank of the screw, having pivoted to its inner face a reversible pawl, H, which engages with a ratchet, I, keyed on the screw to rotate the latter in either direction. With a lever of moderate length geared in this way to a screw of fine pitch the blacksmith can easily upset the heaviest tire in use.

What I claim as my invention, and desire to secure by Letters Patent, is—

The combination, with the bed-plate A, of the stationary clamp-block B and movable clamp-block C, each having a rib, $a$, and serrated cam $b$, the screw D provided with the lugs $d\,d$, wheel F, pawl-lever G, reversible pawl H, and ratchet I, the lug $c$ on the block C and nut E placed between the lugs $e\,e$ on the block B, all constructed and arranged as and for the purpose set forth.

HARLOW S. VINTON.

Witnesses:
GEORGE H. MURDOCK,
C. F. HOWE.